(No Model.)
J. F. STILL.
RAKE FOR HAY LOADERS.
No. 531,658.                           Patented Jan. 1, 1895.
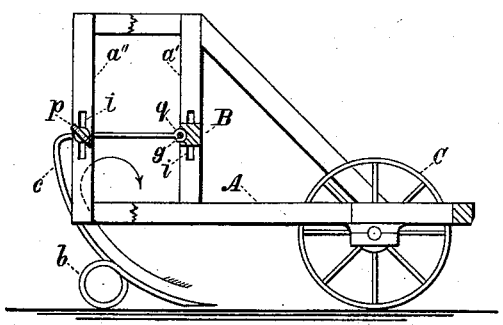
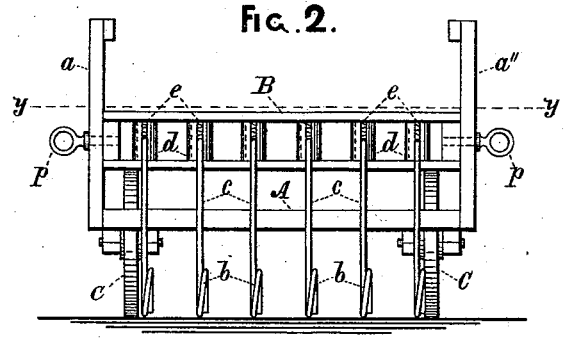
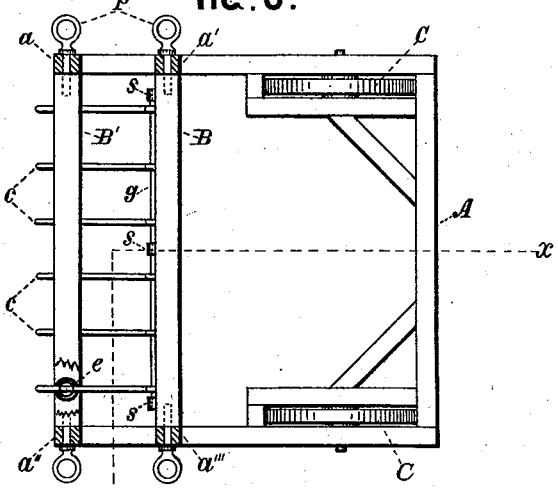
Witnesses
A. W. Newton.
L. M. Keutting
Inventor
James F. Still.
By his Attorney F. S. Davenport

UNITED STATES PATENT OFFICE.

JAMES F. STILL, OF KEMPER, ILLINOIS.

RAKE FOR HAY-LOADERS.

SPECIFICATION forming part of Letters Patent No. 531,658, dated January 1, 1895.

Application filed September 29, 1894. Serial No. 524,529. (No model.)

*To all whom it may concern:*

Be it known that I, JAMES F. STILL, of Kemper, in the county of Jersey and State of Illinois, have invented a new and useful Improvement in Rakes for Hay-Loaders; and I do hereby declare that the following is a full and exact description of the same, reference being had to the accompanying drawings, and to the letters of reference marked thereon.

My invention relates to an improvement in rakes for hay loaders.

My object is to provide a rake of which each tooth shall be independent of the others, and not only free to vibrate vertically so as to adapt itself to any unevenness of the surface of the ground, but also formed so as to sustain the point at any required distance above the ground, and thus avoid taking up trash that should be left upon the field, without leaving anything upon ridges or in hollows that should be taken up; and further, to provide a rake that can be readily adapted to use in connection with any of the ordinary elevators used for hay-loading.

With these ends in view, my invention consists in certain details of construction and combinations of parts hereinafter fully described, and illustrated in the accompanying drawings, in which—

Figure 1 is a side elevation of the rake and its supporting frame taken in the line $x$, $x$, Fig. 3; and Fig. 2 is a rear elevation of the same. Fig. 3 is a plan or top view of the rake and frame, taken in the line $y$, $y$, Fig. 2.

A, represents a rectangular frame supported upon two wheels C, C'. Upon the rear part of said frame are erected four posts $a$, $a'$, $a''$, $a'''$. Between the posts $a'$, $a'''$, is secured a vertically adjustable cross-bar B, to which the rake teeth $c$, $c$, &c., are hinged, and between the posts $a$, $a''$, is secured a vertically adjustable cross-frame B', consisting of a top and bottom bar between which are secured, as shown in Fig. 2, tubular guides $d$, provided on opposite sides thereof with slots adapted to receive the rear horizontal parts of the rake teeth, and allow them to play vertically. It will be noticed that the interior of each of these guides is provided with a spiral spring $e$, adapted to press the rake tooth downward, and that to resist said pressure, each tooth is provided at a little distance to the rear of the point, with a loop $b$, formed so as to slide freely upon the surface of the ground.

In order to admit of the points of the teeth being adjusted to the required height above the surface of the ground, the bar B, is made to slide vertically in slots $i$, in the posts $a'$, $a'''$, and is secured in position by thumb-screws $p$, $p$, and the frame B' is similarly adjustable. (See Figs. 2 and 3.)

It will be readily seen by reference to Fig. 1, that the loop $b$, resting always upon the ground, the points of the teeth may be raised or lowered as required, by simply raising or lowering the bar B; the loop of each tooth being constantly held to the ground by the spring $e$, so that however uneven the surface of the ground may be, the point of each tooth will be kept at nearly the same height above it.

It will be observed that the eyes $q$, of the teeth are partly let into mortises in the cross-bar B, for the purpose of keeping the teeth upright, and that they are hinged to the cross-bar upon a long rod $g$, which passes through them and through staples $s$, $s$, &c., in the cross-bar, so as to secure the teeth in position and yet allow the points thereof to play freely up and down.

The device is operated by being secured to the rear of the wagon to be loaded, in connection with any of the ordinary hay loader elevators. As the rake is drawn forward, the hay is pushed up the inclined part of the teeth as indicated by the arrow in Fig. 1, until it reaches the part that is nearly vertical, from which it falls by the action of gravity, upon the elevator located so as to receive it and convey it to the wagon.

It is obvious that changes in the construction of my device might be resorted to without departing from the spirit of my invention, and hence I would have it understood that I do not limit myself to the exact construction of parts shown and described, but consider myself at liberty to make such changes as come within the scope of my invention.

Having fully described my invention, what I claim, and desire to secure by Letters Patent, is—

In a rake for hay loaders, the combination of teeth formed with circular bows or loops adapted to slide upon the surface of the ground rearward of the points, and a vertically adjustable cross-bar B, to which said teeth are hinged in such manner that by raising or lowering said cross-bar, the points of the teeth will be carried by the circular bows or loops, at any required distance above the surface of the ground; all constructed and adapted to operate substantially as and for the purpose set forth.

In testimony that I claim the foregoing I have hereunto set my hand this 23d day of August, 1894.

JAMES F. STILL.

Witnesses:
O. B. HAMILTON,
F. H. SCHATTGEN.